May 7, 1963  F. VERES  3,089,051
CATADIOPTRIC ELECTROLUMINESCENT GLASS BLOCK
Filed July 17, 1961
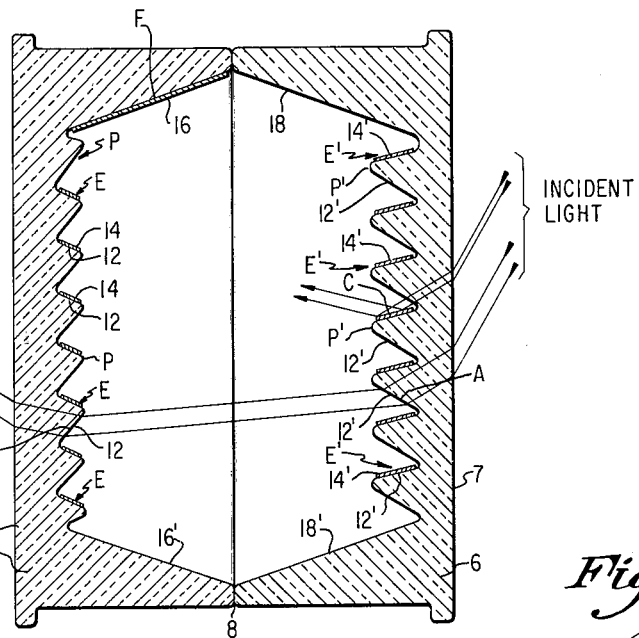
Fig. 1.
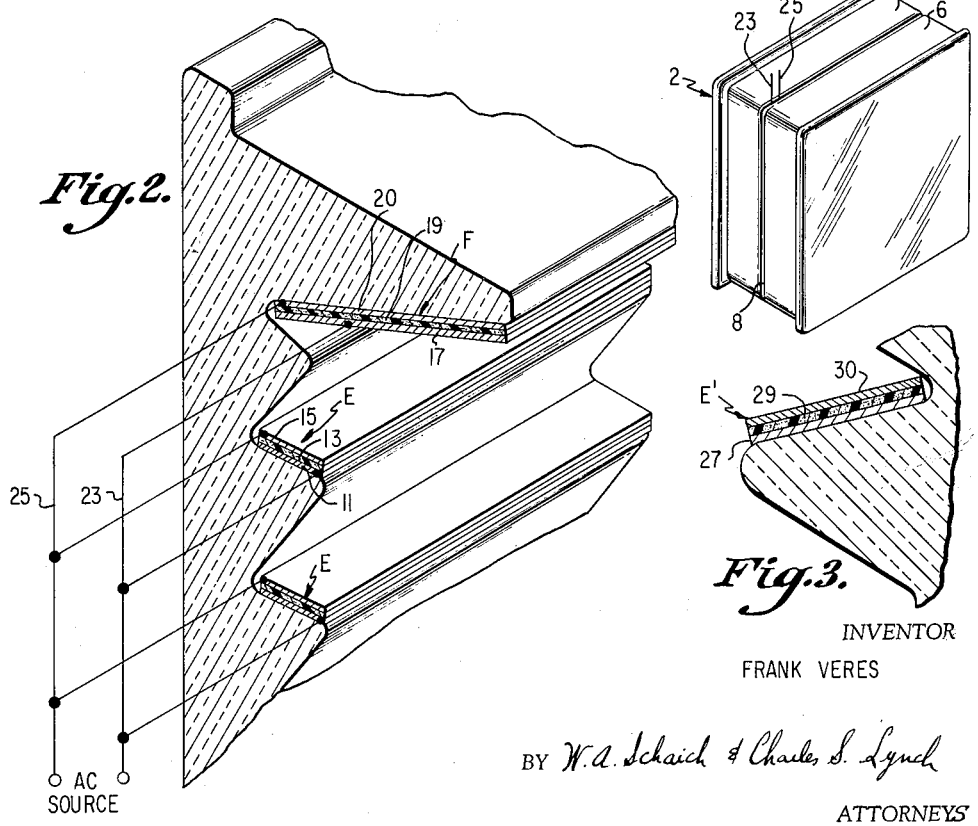
Fig. 2.
Fig. 3.
Fig. 4.
INVENTOR
FRANK VERES
BY W. A. Schaich & Charles S. Lynch
ATTORNEYS United States Patent Office 3,089,051
Patented May 7, 1963

3,089,051
CATADIOPTRIC ELECTROLUMINESCENT
GLASS BLOCK
Frank Veres, Toledo, Ohio, assignor to Owens-Illinois Glass Company, a corporation of Ohio
Filed July 17, 1961, Ser. No. 124,542
7 Claims. (Cl. 313—108)

This invention relates to an improved catadioptric electroluminescent glass block characterized by having an improved light output.

In recent years considerable research has been devoted to the development of satisfactory electroluminescent cells. One well known form of an electroluminescent cell employs a glass base upon which is successively deposited on its interior surface a conducting front coating, a layer of luminescent material, a transparent insulating material, and a final or back coating, such as aluminum, which is conductive. When an alternating current is applied to the above two conductive coatings, the luminescent material sandwiched therebetween is excited to luminescence which well known phenomenon is known as electroluminescence. Typical of the aforementioned electroluminescent cell is the cell described in U.S. Patent 2,714,683.

The use of a highly reflective metal electrode, such as aluminum, as the back coating or electrode is desirable because this reflective electrode will reflect the light out of the electroluminescent cell and thereby enhance the light output of the cell. However, electroluminescent cells incorporating a reflective metal electrode are obviously not transparent due to the opacity of the aluminum back electrode. Accordingly it would appear to be impractical to put an opaque electroluminescent cell into a glass block since this would defeat one of the prime functions of the glass block, namely, to transmit light. However, the present invention solves this problem by providing a catadioptric luminescent glass block with one or more electroluminescent cells having opaque metallic conducting back electrodes disposed in such a manner as not to impair the light transmission and emission characteristics of said block. Moreover, the electroluminescent cell or cells are in turn a source of light due to the above mentioned electroluminescence and would, of course, enhance the light output of the glass block.

It is, therefore, an object of this invention to provide an electroluminescent glass block of improved overall light output.

It is another object of this invention to provide an electroluminescent glass block in which the transmittal of light through said electroluminescent block is substantially undiminished notwithstanding the use of an opaque metallic back electrode in the electroluminescent cell employed in connection with said cell.

These and other objects will become apparent from the description which follows.

The novel electroluminescent glass block of this invention employs a hollow glass block having interior surfaces which are prismatic or angular in structure. In the normal functioning of such a block as a light transmitting medium, certain of these prismatic surfaces are not used for transmitting light due to their angular position with respect to the incident light on said block. Accordingly, an electroluminescent cell having an opaque but reflective metal back electrode, such as aluminum, is positioned on one or more of such surfaces without any substantial diminution of the light transmitting capacity of said block. Of course, the overall light output of the glass block will be enhanced since these non-transmitting surfaces are now electroluminescent surfaces which will emit their own source of light.

Other objects and advantages of the foregoing invention will become more apparent from the following detailed description taken in conjunction with the accompanying drawings in which:

FIG. 1 is a cross sectional view of a catadioptric electroluminescent glass block according to a preferred embodiment of the present invention;

FIG. 2 is a partial perspective view of the left side of the block of FIG. 1;

FIG. 3 is an enlarged cross sectional view of one of the upper right prismatic surfaces of the block of FIG. 2; and FIG. 4 is a perspective view of a glass block embodying the present invention.

Referring to the drawings, as shown in FIG. 1, there is illustrated the novel electroluminescent glass block 2 consisting of an inner half 4 and an outer half 6 joined together by adhesive material 8 which can be any of the conventional sealing materials used to bond glass blocks together. Located within block half 4 are prisms P having a lower angular surface 12 and an upper angular surface 14. Block half 6, which is similar to block half 4 also has prisms P' having lower angular surfaces 12' and upper angular surfaces 14'. Positioned upon one or more of upper surfaces 14 and 14' are electroluminescent cells, which due to the disposition of these angular surfaces, have no substantial effect upon the light transmitting capacity of such blocks.

More specifically, and with particular reference to FIG. 1, there is shown schematically the manner in which light incident on surface 7 enters block half 6, is refracted by the glass, and then passes from one of the lower surfaces 12' designated as A into the hollow interior of the block, from which the light passes through a lower surface 12 designated as B, passes through glass half 4, and emerges at surface 5 thereof. The foregoing description with respect to a particular lower prismatic surface A is also applicable to all the other lower prismatic surfaces 12' of block half 6.

However, with respect to light incident on an upper prismatic surface 14', it will be noted that the angle of such a surface as indicated by C in FIG. 1 is not as suitable for the effective transmission of incident light but rather for the reflection of light. Accordingly on one or more of said surfaces are positioned reflective electroluminescence cells indicated by E'.

With regard to block half 4, a similar disposition of electroluminescent cells is employed such as shown by block half 6. For example, upper prismatic surfaces 14 have located thereon an electroluminescent cell designated as E. In general surfaces 14, like surfaces 14', are less adapted to serve as refracting surfaces and accordingly reflective electroluminescence cells are positioned thereon.

In addition an electroluminescent cell F is shown positioned on upper surface 16 of cell block half 4. For certain applications a further electroluminescent cell (not shown) can be positioned on upper surface 18 of cell block half 6.

With regard to the manner in which the electroluminescent cells are made, reference is made to FIGS. 2 and 3. No novelty is alleged with respect to the construction of these cells per se since conventional methods which are well known in the art are employed in the making thereof. For example, cell F consists of a transparent conductive layer of tin oxide 20 which serves as one conducting electrode of the cell. On top of the tin oxide is placed the phosphor and dielectric suspension 19. Thereafter, a reflective aluminum coating 17 is deposited thereon which also serves as the second conducting electrode of the cell. Electrodes 20 and 17 in turn have conductors 23 and 25, respectively, which are connected to a source of alternating electric current which causes the phosphor material of layer 19 to emit light as is well known in the art. FIG. 2 also illustrates how conductors 23 and 25 are connected in parallel to the other conductors leading from the other electroluminescent cells E. Of course, cell E is made in the same manner as cell F whose layers 20, 19 and 17 correspond to layers 11, 13 and 15, respectively, of cell E, and consist of tin oxide, phosphor and dielectric suspension, and aluminum, respectively.

In FIG. 3 there is shown the construction of an electroluminescent cell E′ for use on the upper prismatic surfaces 14′ of the right half 6 of the glass block 10. Cell E′ consists of three layers, namely, a transparent conductive tin oxide coating 30, a phosphor and dielectric suspension coating 29, and an aluminum layer 27. It will be noted that these layers are in the reverse order with respect to cell E such that layers 30, 29 and 27 of cell E′ correspond to layers 11, 13, and 20, respectively, of cell E. The reason for this reversal of construction of cell E′ is that upper surface 14′ is considered to be more useful as a reflecting surface than it is as a transmitting surface. The normal daylight transmitting function of the glass block is not seriously impaired by the opaque electroluminescent cell E′ which, of course, also emits its own light when excited by a source of alternating current.

FIG. 4 illustrates the completed catadioptric electroluminescent glass block and the manner whereby the conductors 23 and 25 pass out from the block through sealing edge 8.

The manner in which the various layers making up the electroluminescent cell are deposited or formed is well known in the art. For example, the aluminum can be deposited by evaporation. The electroluminescent phosphor layer can be applied by spraying, silk screening, settling or other well known means. In this respect, a suitable spray composition can be made by suspending the phosphor powder in a clear plastic solution as described in U.S. Patent 2,834,093. Another suitable spray composition is a phosphor low melting glass mixture suspended in a vehicle such as acetone, water or the like. Moreover, the phosphor selected will depend upon the particular color desired to be emitted by the cell. For example, fired mixtures of zinc sulfide and zinc selenide in a weight ratio of three to four and which are activated with copper can be employed. These and other phosphors are described in U.S. Patents 2,731,423, 2,566,349 and 2,924,732. The third layer, which is conductive, can be prepared by depositing a layer of tin oxide in accordance with any of the well-known techniques.

Numerous modifications can be made in the construction of the herein disclosed electroluminescent glass block. For example, electroluminescent cells E and E′ are shown as being present on each of the somewhat horizontal surfaces of the internal prisms of block 2. However, one might find it desirable to employ cells on only every other surface or on an even smaller number of surfaces. Although an electroluminescent cell F is shown on upper surface 16, it would be obvious to employ a similar cell on surface 18 or on both surfaces. Moreover, electroluminescent cells could be positioned on either of lower surfaces 16′ and 18′ or both if found desirable.

In addition the cells can employ different phosphors so that novel color effects will be emitted by the blocks due to the phenomenon of electroluminescence. Furthermore, where a reverse cell construction is shown with cells E′ on the right half of the block (FIG. 3) in comparison to the cells E used on the left half of the block (FIG. 2), it may be found desirable to vary this construction with respect to the number and kind of electroluminescent cells employed depending upon the light effect desired or the angle of the prismatic surfaces within block 10. Of course the angles of these surfaces on which the electroluminescent cells are deposited will exert some control on the direction and intensity of the light emitted from the block 10. The light from these cells is either refracted through or reflected from other parts and surfaces of the glass block until finally the light is emitted from the glass block. A person skilled in optics can also vary, within limits, these other parts of the block in order to get maximum utilization of the light given off by the opaque electroluminescent cell without at the same time impairing function of the block in transmitting and controlling daylight incident on the block.

Although as set forth above an E′ cell ordinarily has the aluminum, phosphor and dielectric suspension, and tin oxide layers in reverse order with respect to an E cell, it is to be noted that under certain conditions, depending upon the incident light, some of the E′ cells can be identical in construction to the E cells, that is, the three layers can be in the same relative position.

The electrical field for exciting the phosphor particles in the electroluminescent cell can be obtained by impressing a 60 cycle, 120 volt source of electrical current across the conductors leading to the cells. This current can be brought to each glass block, for example, by means of insulated electrical conductors 23 and 25 placed in the mortar 8 between the block halves 4 and 6 (FIG. 4).

While I have described and illustrated preferred embodiments of my invention, I wish it to be understood that I do not intend to be restricted solely thereto, but that I do intend to cover all modification thereof which would be apparent to one skilled in the art and which come within the spirit and scope of my invention.

What I claim is:

1. A hollow catadioptric electroluminescent glass block having a pair of spaced apart inner surfaces, said surfaces having a plurality of similarly shaped prisms each having upper and lower surfaces, and at least one of said prism surfaces having an electroluminescent cell positioned thereon.

2. A hollow catadioptric electroluminescent glass block having a pair of spaced apart inner surfaces, said surfaces having a plurality of similarly shaped prisms each having upper and lower surfaces, said lower surfaces constituting refracting surfaces and said upper surfaces having a reflecting electroluminescent cell positioned thereon so as to make said upper surfaces reflecting surfaces.

3. A hollow catadioptric electroluminescent glass block having a pair of spaced apart inner surfaces, said surfaces having a plurality of similarly shaped prisms each having upper and lower surfaces, and at least one of said prism surfaces having an electroluminescent cell positioned thereon consisting of superimposed layers of a reflecting metal, of phosphor containing electroluminescent material, and of a conductive material.

4. A hollow catadioptric electroluminescent glass block comprising a first inner surface with prisms thereon, a second inner surface with prisms thereon and spaced apart from said first surface, said prisms having upper and lower surfaces, and at least one electroluminescent cell positioned on an upper surface of one of said prisms.

5. A hollow catadioptric electroluminescent glass block comprising a first inner surface with prisms thereon, a second inner surface with prisms thereon and spaced apart from said first surface, said prisms having upper and lower surfaces, at least one electroluminescent cell positioned on an upper surface of a prism located on the first inner surface, and at least one electroluminescent cell positioned on an upper surface of a prism located on the second inner surface.

6. The block of claim 5 in which the electroluminescent cell positioned on an upper surface of a prism located on the first inner surface consists of superimposed layers of a reflective metal, of a phosphor containing material, and of a conductive coating and at least one electroluminescent cell positioned on an upper surface of a prism located on the second inner surface consisting of superimposed layers of a conductive coating, of a phosphor containing material, and of a reflective metal.

7. A hollow catadioptric electroluminescent glass block having a pair of spaced apart upper and lower surfaces, a pair of spaced apart inner surfaces, said surfaces having a plurality of similarly shaped prisms each having upper and lower surfaces, and at least one of said surfaces having an electroluminescent cell positioned thereon.

No references cited.